United States Patent [19]
Renaud

[11] 3,961,716
[45] June 8, 1976

[54] MOBILE HOUSING UNIT

[76] Inventor: Michel G. Renaud, 71 Youville, Varennes, Quebec, Canada

[22] Filed: May 6, 1974

[21] Appl. No.: 467,598

[52] U.S. Cl. .............................. 214/85; 280/81 R; 296/23 R
[51] Int. Cl.² ........................................ B65G 67/02
[58] Field of Search ................. 214/85, 85.1, 86 A; 296/23 R, 1 A; 280/81 R, 81 A, 104.5 R

[56] References Cited
UNITED STATES PATENTS

| | | | |
|---|---|---|---|
| 1,175,063 | 3/1916 | Koechlin | 214/85 X |
| 2,541,288 | 2/1951 | Rice | 214/85 |
| 2,701,069 | 2/1955 | Hawkins | 214/86 A |
| 3,257,124 | 6/1966 | Mendez | 280/81 R |

*Primary Examiner*—Albert J. Makay
*Attorney, Agent, or Firm*—Robert E. Mitchell; Alan Swabey

[57] ABSTRACT

A mobile housing unit with an integral garage. The mobile home unit includes a chassis, a wheel structure suspended from the chassis at the rear end thereof, and front wheel receiving seats provided on the suspended wheel structure for receiving the front wheels of an automobile in the garage. A ramp platform for supporting the rear wheels of the automobile flexibly connected to the suspended wheel structure at the front end and to the mobile housing unit at the rear end thereof. A loading ramp is hingedly connected to the platform and is adapted to close the garage door. The largest proportion of the weight of the automobile is thereby supported on the independent wheel structure suspended from the chassis.

5 Claims, 5 Drawing Figures

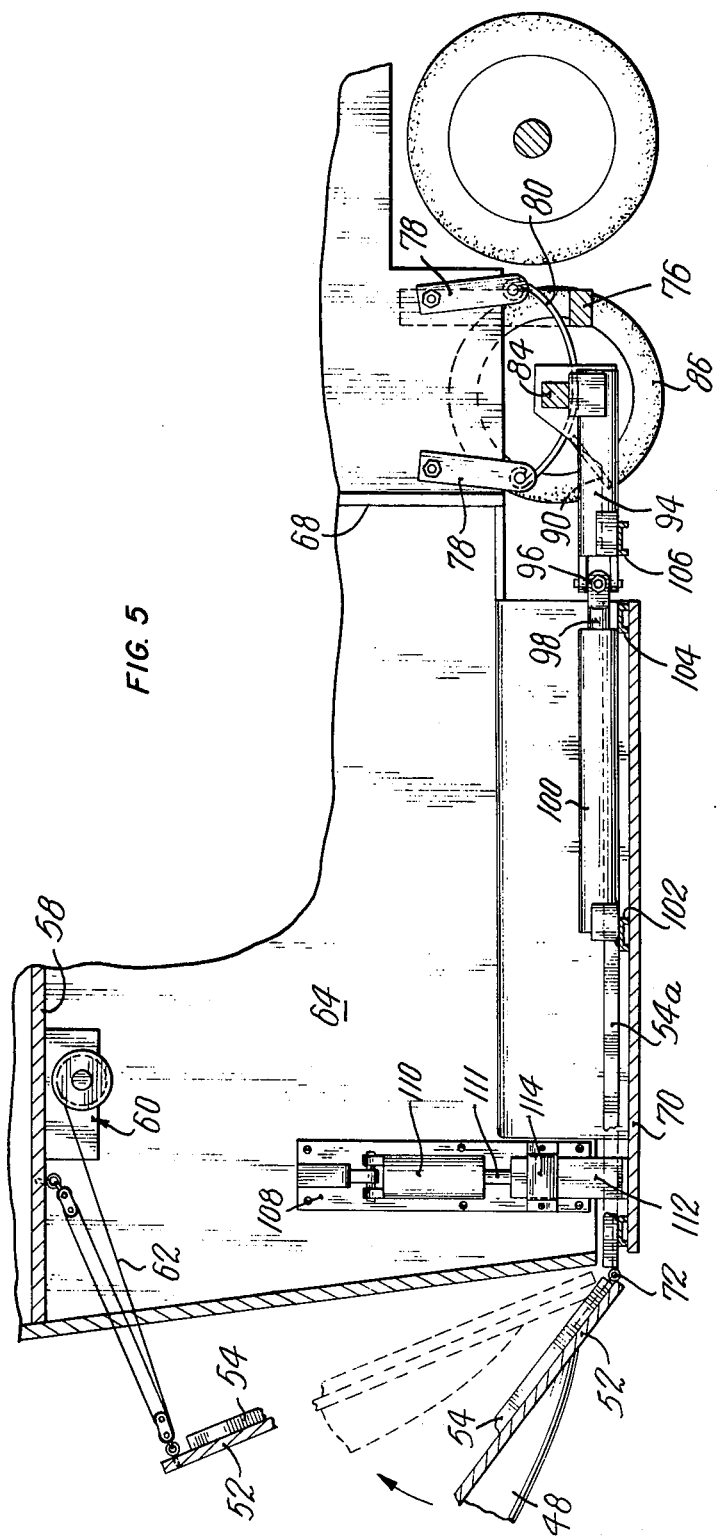

MOBILE HOUSING UNIT

BACKGROUND OF THE INVENTION

1. Field of the Invention

The present invention relates to a self-powered vehicle, and more particularly to a vehicle adapted to carry a second vehicle in a trailing manner.

2. Description of the Prior Art

Recently, there has been much development in self-contained, self-powered mobile housing units wherein a truck-type chassis is provided, and the living quarters are built up and supported by the truck chassis, either integral with the driver's cab or separate therefrom. These mobile housing units are used normally for recreational travelling and camping. They can also be used to advantage as a travelling business office and living quarters, particularly suited to travelling salesmen and the like.

One of the disadvantages of these mobile housing units is that once they are parked at a trailer park or camping site, which is usually on the outskirts of a town, they cannot be practically used as a suitable transport vehicle for travelling to locations at short range from the camping site or trailer park. First of all, these mobile housing units are quite large and are difficult to maneuver in urban areas unless one is an experienced bus driver or truck driver, and secondly, each time the mobile housing unit must be used for short trips to surrounding locations, all dishes, cutlery and other small items must be stored so that they do not get bounced around.

Some developments have been made in providing a form of integrated garage on the rear of the mobile home which normally consists of a recessed opening including a ramp and a winch for loading a small, compact-size automobile onto the housing unit within the recessed garage. However, such a solution is often impractical since the total weight of the automobile must be carried by the truck chassis which greatly reduces the weight bearing capacity of the mobile housing unit since even sub-compact automobiles weigh at least 1500 pounds, and some of the equipment carried in the living quarters must be compromised to make way for the weight of the automobile. Also, the automobile must be carried fairly high on the chassis which greatly reduces the living space available within the living quarters of the housing unit.

SUMMARY OF THE INVENTION

It is an aim of the present invention to provide a combined housing unit and garage whereby an automobile can be contained and carried within the housing unit without compromising the weight capacity of the truck chassis and reducing the space requirement of the garage to a minimum by providing the garage at the lowest possible portion of the vehicle, that is, partly below the truck chassis, thereby enabling part of the living quarters to be provided above the garage.

It is also an aim of the present invention to provide means for trailing an automobile behind a vehicle chassis such that the trailer is integral and independently suspended from the chassis such that the trailer portion moves in unison with the truck chassis but the trailing weight is mostly independently supported on separate load-bearing wheels suspended from the chassis.

A construction in accordance with the present invention includes a self-powered vehicle having a chassis, rear wheels mounted on the chassis, a load-bearing wheel structure including a pair of wheels and a frame extending between the wheels being suspended on springs from the chassis behind the rear wheels of the vehicle, the frame including means for receiving the front wheels of a vehicle to be carried, the chassis including frame means extending rearwardly of the load-bearing wheel structure, a ramp flexibly connected to the frame between the wheels and pivoted at the rear end thereof to the frame extending rearwardly of the chassis for receiving the rear wheels of the vehicle to be carried.

In a more specific embodiment of the present invention, there is provided living quarters on the chassis of the vehicle and a housing defines living quarters and a garage, the garage extending over the frame, means extending rearwardly of the chassis and covering the ramp, living quarters extending above the garage and a door hingedly connected to the ramp which can be used as a loading ramp for the vehicle to be carried and as a door for closing the garage space.

BRIEF DESCRIPTION OF THE DRAWINGS

The invention will now be described in detail having reference to the accompanying drawings, in which:

FIG. 5 is fragmentary cross-sectional view taken along line V—V of FIG. 4.

DESCRIPTION OF THE PREFERRED EMBODIMENT

Figure 1:
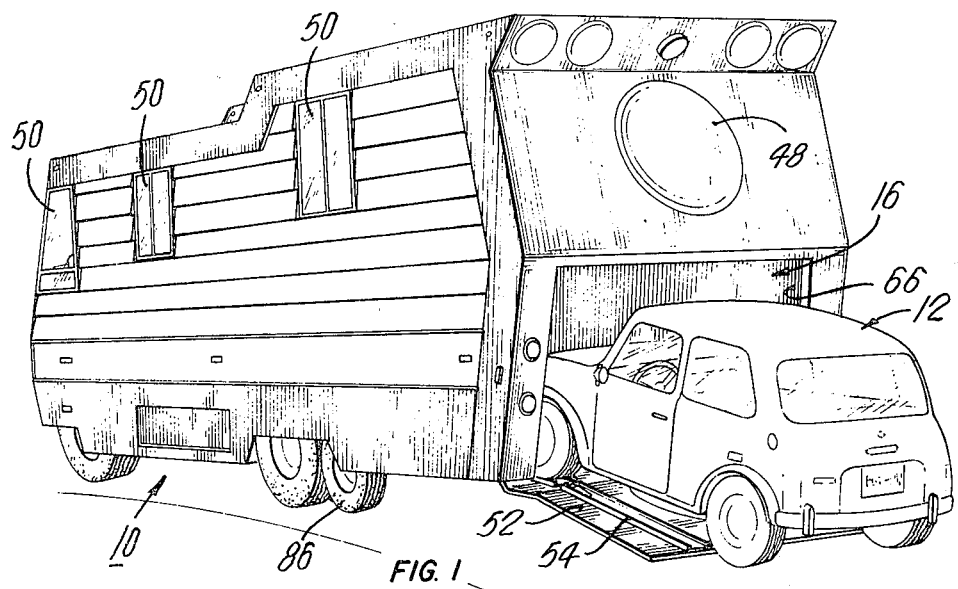
FIG. 1 is a rear perspective view of the mobile housing unit showing an automobile being loaded in the garage portion.
Figure 2:
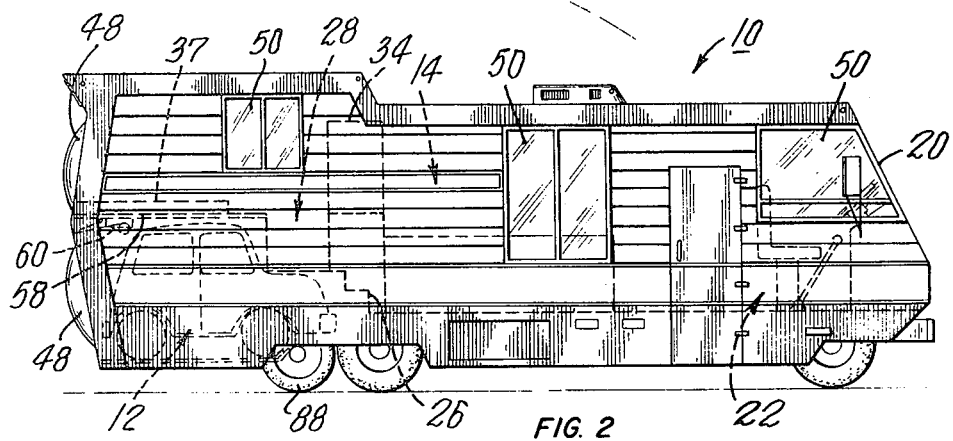
FIG. 2 is a side elevation view of the mobile housing unit showing the garage and living quarters in dotted lines.
Figure 3:
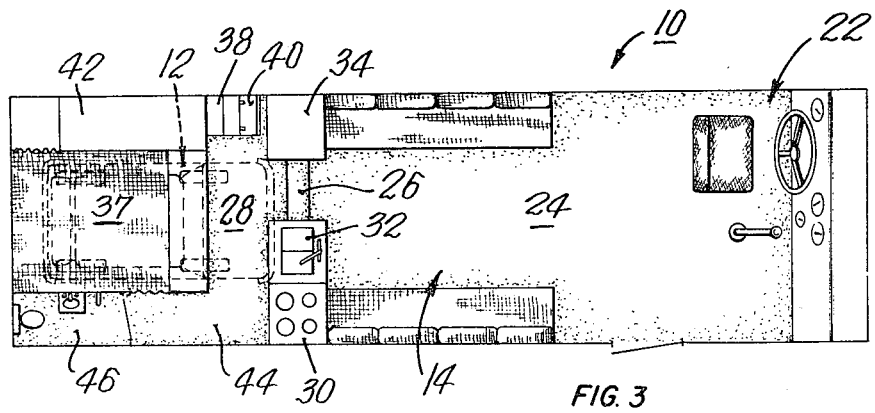
FIG. 3 is a plan view of the living quarters of the mobile housing unit.
Figure 4:
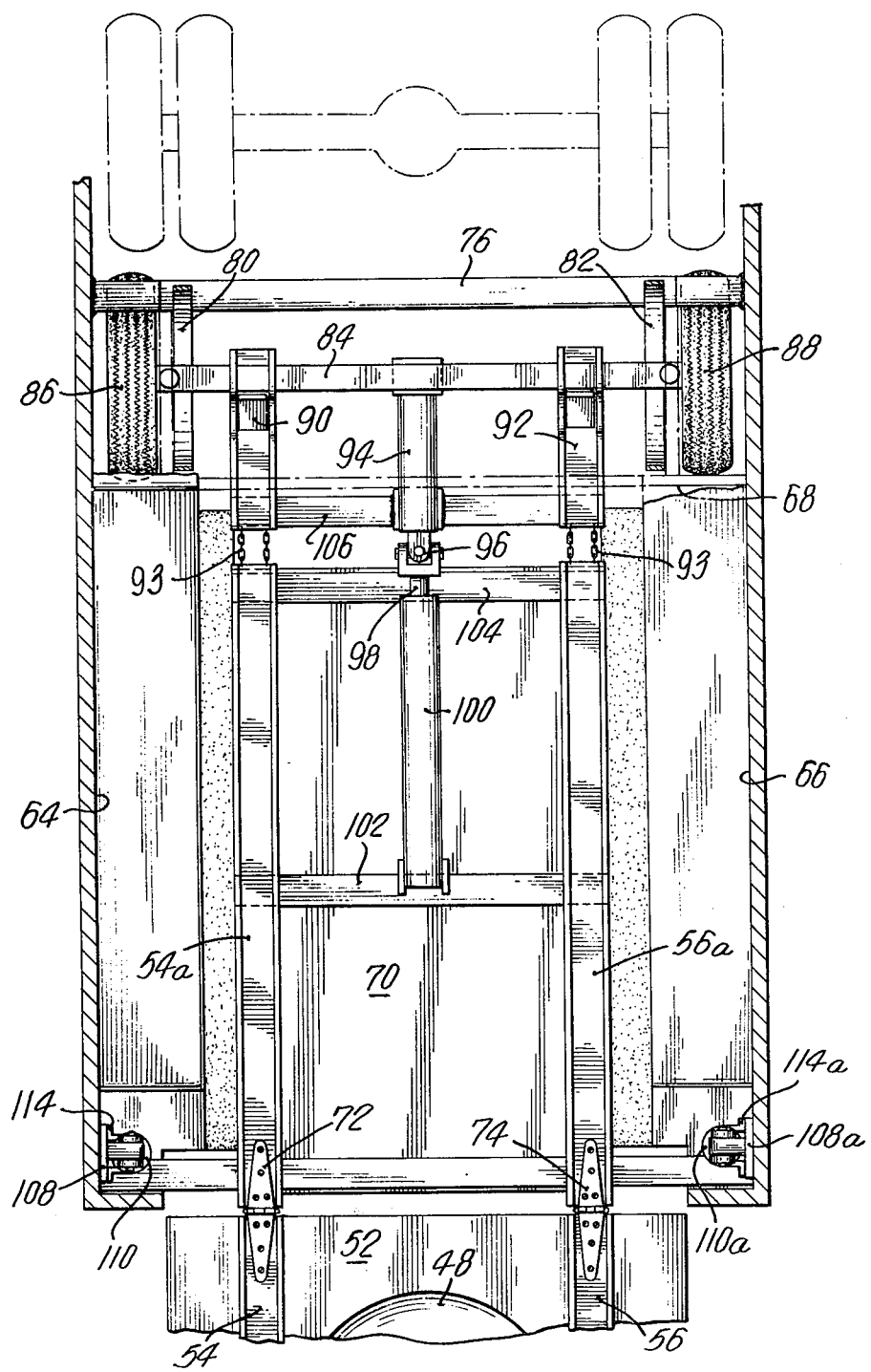
FIG. 4 is a fragmentary detail plan view of the ramp within the garage space.

The mobile housing unit 10 of the embodiment shown in the drawings includes living quarters 14 and a garage 16 in which an automobile 12 can be carried. The living quarters of the mobile housing unit 10 includes a front windshield 20, a driver's cab area 22, and a living room area 24. The housing unit is of a split level construction in view of the garage 16. Steps 26 are provided communicating upwardly with a kitchen area 28 which includes a stove location 30, sink and faucet 32 and refrigerator storage area 34, dividing the living room from the kitchen floor area 28. An eating counter 36 is provided rearwardly thereof and separates the kitchen from the still further elevated bed 37. On either side of the bed 37 is a closet 42 and a bathroom 46. The bathroom 46 communicates with the bed area 37 and the kitchen area 28 by a corridor 44. Natural light is allowed into the living quarters by means of the dome window 48 and the side conventional windows 50.

The garage 16 communicates with the kitchen area 28 by means of a stairwell 38. The garage 16 includes a door-ramp 52 closing the opening of the garage. The ramp 52 includes channel-shaped wheel tracks 54 and 56 for loading the automobile 12, as will be described later. The garage includes a ceiling 58 which is the floor of the bedroom 37, and a winch 60 is provided on the ceiling 58 for operating the door 52 by means of the winch wire 62 which can be hooked to a suitable location on the door-ramp 52.

Garage side walls 64 and 66 are connected to the ceiling 58, while a garage front wall 68 is formed at the end of the truck-type chassis 76 on which the mobile housing unit is constructed. An independent suspended wheel structure is suspended from the rear of the chassis by means of spring brackets 78 mounting leaf springs 80 and 82 respectively. A shaft 84 is connected to the leaf springs and mounts freely rotating wheels 86 and 88. Wheel seats 90 and 92 are fixedly mounted to the shaft 84, and these are provided for supporting the front wheels of the automobile being carried. In conventional automobiles, the engine is supported over the front wheels of the automobile and, therefore, the greatest proportion of the weight and the mass weight center of the automobile is in the forward area of the automobile and close to the center line of the front wheels. In the present invention, the front wheels of the trailing automobile are supported directly on the wheel structure including wheels 86 and 88, which therefore carry the greatest proportion of the weight of the automobile directly to the ground and, therefore, eliminates this weight from the chassis of the truck. A ramp platform 70 extends rearwardly of the wheel seat members 90 and 92 and is connected thereby by chains 93. In order to keep the alignment of the trailing ramp with the wheels 86 and 88 and the chassis 76, a flexible universal joint 96 is provided, including a universal joint mounting 94 fixed to the frame extending between the wheels 86 and 88 including the shaft 84. A cross brace 106 extends between the wheel seats 90 and 92 and also supports the universal joint mounting 94. The universal joint is connected to a universal joint rod 98 which slides linearly in the cylinder 100 which in turn is mounted to channel-shaped cross frame members 102 and 104 connected to the ramp 70 and especially to the channel-shaped wheel tracks 54a and 56a. The ramp 70 is connected at its rear to the frame of the housing unit on the chassis by means of connecting bars 112 and 112a which are connected to pistons 111 and 111a to cylinders 110 and 110a and finally through brackets 108 mounted on the side walls 64 and 66 respectively. The piston and cylinder arrangement 110 and 111 and 110a and 111a allows for moving the ramp downwardly when the automobile is being loaded onto the ramp. In any case, the ramp 70 is connected directly to the frame of the housing unit mounted on the chassis but is flexibly connected to the front wheel seat members 90 and 92 on the shaft 84 allowing shaft 84 to ride independently of the frame on the chassis. When it is required to load the automobile into the garage, the winch 60 is activated to lower the door 52. Simultaneously, the cylinders 110 and 110a are activated to extend downwardly and move the ramp 70 downwardly a few inches. The automobile is then driven up on the rampdoor 52 and the ramp 70 until the front wheels are sitting on the wheel receiving seats 90 and 92 with the rear wheels on the tracks 54a and 56a. Then, the door 52 is hinged upwardly about the hinges 72 and 74 by means of the winch 60, and simultaneously, the pistons 111 and 111a are retracted in the cylinders 110 and 110a to lift the ramp 70 to a transport position.

I claim:

1. A self-powered vehicle having a chassis and at least first rear wheels on the chassis, a secondary load-bearing wheel structure including at least a pair of wheels being suspended on springs from the chassis, the secondary structure being provided with means for receiving at least a portion of a vehicle ro be carried whereby said vehicle to be carried is at least partially supported independently of said chassis, and connecting means provided to allow the load-bearing wheel structure limited flexible movement relative to the chassis, said connecting means including a universal joint adapted for axial sliding movement to allow the load-bearing wheel struture to have relative flexible and independent movement from the truck chassis.

2. A vehicle as defined in claim 1, wherein the connecting means further includes flexible connecting means and with the universal joint allows the load-bearing wheel structure to have the relative flexible and independent movement from the truck chassis.

3. A vehicle as defined in claim 1, wherein the means for receiving the front wheels of the vehicle to be carried are channel-shaped members fixed to the shaft extending between the wheels.

4. A self-powered vehicle as defined in claim 1, wherein the secondary load-bearing wheel structure is suspended from the chassis by means of leaf springs rearwardly and aligned with the rear wheels of the chassis, a ramp rearward of the secondary load-bearing wheel structure being connected at the opposite end to the chassis, the front end of the ramp being connected to the load-bearing wheel structure by means of the universal joint adapted for longitudinal sliding movement relative to the ramp and the secondary load-bearing wheel structure, further flexible connecting limiting means provided on either side of the universal joint connecting the ramp to the secondary load-bearing wheel structure.

5. A vehicle as defined in claim 4, wherein the ramp is adapted for positive pivoting movement relative to the universal joint on the load-bearing wheel structure and a further loading ramp is pivotally mounted to the end of the ramp, and the further ramp as well as the first ramp and the load-bearing wheel structure includes channelshaped track means allowing the wheels of the vehicle to be loaded to be driven on the ramps and onto the loadbearing wheel structure.

* * * * *